(12) United States Patent
Ohtani et al.

(10) Patent No.: US 7,510,673 B2
(45) Date of Patent: Mar. 31, 2009

(54) ELECTROCONDUCTIVE PASTE AND CERAMIC ELECTRONIC COMPONENT INCLUDING ELECTROCONDUCTIVE PASTE

(75) Inventors: Akira Ohtani, Yasu (JP); Yuji Ukuma, Echizen (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 11/599,461

(22) Filed: Nov. 15, 2006

(65) Prior Publication Data
US 2007/0057237 A1    Mar. 15, 2007

Related U.S. Application Data

(63) Continuation of application No. PCT/JP2005/008607, filed on May 11, 2005.

(30) Foreign Application Priority Data

Jul. 6, 2004 (JP) ............... 2004-199621
Dec. 28, 2004 (JP) ............... 2004-381312

(51) Int. Cl.
*H01B 1/02* (2006.01)
(52) U.S. Cl. .......... 252/512; 252/514; 216/95; 361/305; 501/16; 501/19; 501/32; 501/64
(58) Field of Classification Search ........ 252/500, 252/512, 518.1, 514; 361/305, 306.5; 501/19, 501/79, 16, 32, 64; 428/195; 216/95
See application file for complete search history.

(56) References Cited

U.S. PATENT DOCUMENTS

| | | | |
|---|---|---|---|
| 4,521,524 A * | 6/1985 | Yamashita | 501/64 |
| 5,378,408 A * | 1/1995 | Carroll et al. | 252/514 |
| 5,468,695 A * | 11/1995 | Carroll et al. | 501/79 |
| 5,785,879 A * | 7/1998 | Kawamura et al. | 216/95 |

(Continued)

FOREIGN PATENT DOCUMENTS

JP    04-187540    *    7/1992

(Continued)

OTHER PUBLICATIONS

Written Opinion of the International Searching Authority dated Aug. 23, 2005.

*Primary Examiner*—Mark Kopec
*Assistant Examiner*—Khanh Tuan Nguyen
(74) *Attorney, Agent, or Firm*—Dickstein Shapiro LLP

(57) ABSTRACT

For mounting on a substrate by using an electroconductive adhesive, an electroconductive paste for forming an external electrode which has improved moisture resistance and which is resistant to occurrence of external-electrode peeling, as well as a ceramic electronic component including the electroconductive paste are provided. The electroconductive paste includes a base-metal electroconductive powder, first glass frit, and an organic vehicle, wherein the first glass frit has a $B_2O_3$ content of 10 to 20 percent by mole, a $SiO_2$ content of 50 to 65 percent by mole, an alkali metal oxide content of 10 to 20 percent by mole, a ZnO content of 1 to 5 percent by mole, a $TiO_2$ content of 1 to 5 percent by mole, a $ZrO_2$ content of 1 to 5 percent by mole, and an $Al_2O_3$ content of 1 to 5 percent by mole.

18 Claims, 1 Drawing Sheet

U.S. PATENT DOCUMENTS

| | | | |
|---|---|---|---|
| 5,795,501 A * | 8/1998 | Kano | 252/514 |
| 6,198,618 B1 * | 3/2001 | Ohtani et al. | 361/306.3 |
| 6,348,426 B1 * | 2/2002 | Sanada et al. | 501/19 |
| 6,436,316 B2 * | 8/2002 | Matsumoto | 252/512 |
| 7,176,152 B2 * | 2/2007 | Brown et al. | 501/16 |
| 7,282,163 B2 * | 10/2007 | Tanaka et al. | 252/518.1 |
| 2002/0006023 A1 * | 1/2002 | Maegawa et al. | 361/305 |
| 2003/0038280 A1 * | 2/2003 | Kojo et al. | 252/514 |
| 2003/0044582 A1 * | 3/2003 | Sakoske | 428/195 |
| 2004/0043885 A1 * | 3/2004 | Hormadaly | 501/32 |
| 2004/0222407 A1 * | 11/2004 | Mears | 252/500 |

FOREIGN PATENT DOCUMENTS

| | | | |
|---|---|---|---|
| JP | 05-047960 | * | 2/1993 |
| JP | 6-309921 | | 11/1994 |
| JP | 8-96623 | | 4/1996 |
| JP | 2001-307947 | | 11/2001 |
| JP | 2004-186108 | | 7/2004 |

\* cited by examiner

ELECTROCONDUCTIVE PASTE AND CERAMIC ELECTRONIC COMPONENT INCLUDING ELECTROCONDUCTIVE PASTE

This is a continuation of application Ser. No. PCT/JP2005/008607, filed May 11, 2005.

TECHNICAL FIELD

The present invention relates to a ceramic electronic component, which is provided with a laminate of base-metal internal electrode layers and ceramic layers laminated alternately and which has external electrodes electrically connected to the internal electrodes. In particular, the present invention relates to an electroconductive paste suitable for forming the external electrodes of the above-described ceramic electronic component to be mounted on a circuit substrate by using an electroconductive adhesive and a ceramic electronic component including the electroconductive paste.

BACKGROUND ART

Since an external electrode of a ceramic electronic component formed by using an electroconductive paste has been previously mounted on a circuit substrate by using solder, the surface of the above-described external electrode has been plated with Ni and, thereafter, the Ni surface has been subjected to a plating treatment with Sn/Pb and/or Sn for the purpose of improving the solder wettability and the adhesion strength to the substrate.

In recent years, demand for products which do not include Pb have increased as concerns about its environmental influence have intensified. In consideration of such circumstances, a method by using an electroconductive adhesive has been noted as a mounting method without using solder containing Pb in connection with the mounting of ceramic electronic components on circuit substrates as well.

However, it is not preferable that the mounting method using an electroconductive adhesive is applied to the external electrode which has been subjected to the plating treatment because the contact resistance between the above-described external electrode and the electroconductive adhesive is increased and the electrical characteristics are deteriorated.

Examples of external electrodes of ceramic electronic components suitable for the mounting method by using electroconductive adhesives include a technology proposed in Patent Document 1. In this technology, a base metal, e.g., Cu or Ni, is used for the first layer in consideration of the electrical connectability of the base metal to the external electrode. A noble metal, e.g., Ag, Pd, or Ag/Pd, which is resistant to oxidizing, is used as the second layer for the purpose of preventing the occurrence of a problem in that the oxidation resistance is deteriorated because no plating treatment is carried out. Furthermore, for the purpose of improving the moisture resistance, a strontium borosilicate based glass frit or the like is added to the electroconductive paste for forming the external electrode. Patent Document 1: Japanese Unexamined Patent Application Publication No. 2001-307947

DISCLOSURE OF INVENTION

Problems to be Solved by the Invention

A glass frit, such as a strontium borosilicate based glass frit, exhibiting high moisture resistance has a property that the softening point of the glass is high. Therefore, if the baking temperature of the external electrode is increased in response to the above-described softening point of the glass frit, abnormal growth of an alloy layer occurs at an interface between Cu or Ni in the first layer and Pd or Ag in the second layer, and, thereby, external-electrode peeling occurs. If the baking is performed at a temperature lower than the above-described softening point of the glass frit, the bonding force between the external electrode (first layer) and the ceramic element is reduced, and the above-described external-electrode peeling also occurs.

Here, the above-described external-electrode peeling (also referred to as poor appearance) refers to the state (a) in which the external electrode of the second layer has peeled and even a small portion of the first layer external electrode serving as a substrate electrode is exposed, or in the state (b) in which the first layer external electrode (including the second layer external electrode) has peeled and even a small portion of the ceramic element serving as a substrate is exposed, when the external electrode is visually observed with a loupe of a magnification of 10 times from a side surface direction of the ceramic electronic component.

The present invention has been made to solve the above-described problems. Accordingly, it is an object of the present invention to provide an electroconductive paste for forming an external electrode which has improved moisture resistance and which is resistant to occurrence of external-electrode peeling in order to perform mounting on a substrate by using an electroconductive adhesive, as well as a ceramic electronic component including the electroconductive paste.

Means for Solving the Problems

An electroconductive paste according to a first aspect of the present invention is characterized by including a base-metal electroconductive powder, first glass frit, and an organic vehicle, wherein the first glass frit has a $B_2O_3$ content of 10 to 20 percent by mole, a $SiO_2$ content of 50 to 65 percent by mole, an alkali metal oxide content of 10 to 20 percent by mole, a ZnO content of 1 to 5 percent by mole, a $TiO_2$ content of 1 to 5 percent by mole, a $ZrO_2$ content of 1 to 5 percent by mole, and an $Al_2O_3$ content of 1 to 5 percent by mole.

An electroconductive paste according to a second aspect of the present invention is characterized in that in the electroconductive paste according to the first aspect, the above-described electroconductive powder includes a primary component composed of Ag and a secondary component composed of Pd and/or Au, the above-described primary component is a mixture of a spherical powder (A) having an average particle diameter of 0.5 to 1.0 μm and a flat powder (B) having an average particle diameter of 1.5 to 5.0 μm and an aspect ratio of 5 to 70 in an A:B ratio of 20:80 to 80:20, and the above-described secondary component is a spherical powder.

An electroconductive paste according to a third aspect of the present invention is characterized in that the electroconductive paste according to the first aspect or the second aspect further includes a second glass frit containing 10 to 30 percent by mole of $Bi_2O_3$, wherein when the total of the above-described first glass frit and the above-described second glass frit is assumed to be 100 percent by weight, the content of the above-described second glass frit is 0.3 to 1.0 percent by weight.

A ceramic electronic component according to a fourth aspect of the present invention is characterized by including a ceramic element, internal electrodes disposed in the inside of the above-described ceramic element, and external electrodes disposed on the surfaces of the above-described ceramic element and electrically connected to the above-described internal electrodes, wherein at least an exposed portion of the above-described external electrode is formed by baking the electroconductive paste according to any one of the above-described first to third aspects.

In the electroconductive paste of the present invention, the amounts of addition of the constituent components of the first glass frit are specified for the following reasons.

The content of $B_2O_3$ is 10 to 20 percent by mole. If the content of $B_2O_3$ exceeds 20 percent by mole, the moisture resistance of the glass frit is reduced and, as a result, the reliability (particularly the moisture resistance) of the ceramic electronic component is reduced. If the content of $B_2O_3$ becomes less than 10 percent by mole, the glass frit becomes hard to vitrify and, in addition, it becomes hard to decrease the softening temperature of the glass frit. As a result, the glass frit is not satisfactorily softened during baking of the external electrodes, pores in the above-described external electrodes cannot be filled with the glass frit and, therefore, the reliability (particularly the moisture resistance) of the ceramic electronic component is reduced.

The content of $SiO_2$ is 50 to 65 percent by mole. If the content of $SiO_2$ exceeds 65 percent by mole, the softening temperature of the glass frit is increased and, in addition, the affinity with the ceramic element constituting the ceramic electronic component is reduced. As a result, the adhesion between the external electrodes and the above-described ceramic element is reduced. If the content of $SiO_2$ becomes less than 50 percent by mole, the moisture resistance of the glass frit is reduced and, as a result, the reliability (particularly the moisture resistance) of the ceramic electronic component is reduced.

The content of alkali metal oxide ($Li_2O$, $Na_2O$, or the like) is 10 to 20 percent by mole. If the content of alkali metal oxide exceeds 20 percent by mole, the moisture resistance of the glass frit is reduced and, as a result, the reliability (particularly the moisture resistance) of the ceramic electronic component is reduced. If the content of alkali metal oxide becomes less than 10 percent by mole, the softening temperature of the glass frit is increased undesirably.

The content of ZnO is 1 to 5 percent by mole. If the content of ZnO exceeds 5 percent by mole, the reactivity between the ceramic element constituting the ceramic electronic component and the glass frit is increased. As a result, the reliability (particularly the moisture resistance) of the ceramic electronic component is reduced due to the resulting reaction products. If the content of ZnO becomes less than 1 percent by mole, the softening temperature of the glass frit is increased and, in addition, the affinity with the ceramic element constituting the ceramic electronic component is reduced. As a result, the adhesion between the external electrodes and the above-described ceramic element is reduced.

The amount of addition of each of $TiO_2$, $ZrO_2$, and $Al_2O_3$ is 1 to 5 percent by mole. If the amount of addition of each of $TiO_2$, $ZrO_2$, and $Al_2O_3$ exceeds 5 percent by mole, the glass becomes hard to vitrify. If the amount is less than 1 percent by mole, the reliability (particularly the moisture resistance) is reduced.

Preferably, the electroconductive powder in the present invention contains Ag as a primary component. Preferably, Ag serving as the primary component is a mixture of a spherical powder (A) having an average particle diameter of 0.5 to 1.0 μm and a flat powder (B) having an average particle diameter of 1.5 to 5.0 μm and an aspect ratio of 5 to 70 in an A:B ratio of 20:80 to 80:20. Here, the aspect ratio of the flat powder refers to a ratio of a major axis to a minor axis (major axis/minor axis) where the flat powder is assumed to be in an elliptical shape. When the spherical powder and the flat powder are mixed in the above-described ratio, the denseness of the external electrode can be increased and the coating shape of the paste can be stabilized.

Preferably, the electroconductive powder in the present invention contains Pd and/or Au as a secondary component. Preferably, Pd and/or Au serving as the secondary component is a spherical powder. When the spherical component is used, alloying with a Ag powder can be facilitated. Furthermore, the migration resistance of the external electrode can be enhanced by containing this secondary component. It is preferable that the mixing ratio (Ag:Pd and/or Au) of the primary component to the secondary component is within the range of 9:1 to 4:1. It is not preferable to fall outside the above-described range because the electrical characteristics of the ceramic electronic component are deteriorated.

Furthermore, it is preferable that the electroconductive powder in the present invention includes the second glass frit containing 10 to 30 percent by mole of $Bi_2O_3$. Preferably, when the total of the first glass frit and the second glass frit is assumed to be 100 percent by weight, the content of the second glass frit is 0.3 to 1.0 percent by weight. The external electrode, which is resistant to peeling and which has excellent appearance, can be formed by including the second glass frit in the above-described content. If the content of the second glass frit is less than 0.3 percent by weight, the amount of glass present at the interface between the external electrode and the ceramic element is decreased and, thereby, peeling of the external electrode may occur. If the content of the second glass frit exceeds 1.0 percent by weight, no peeling occurs. However, a reaction of metals with each other (for example, AgPd and Cu) in the inside of the external electrode may be facilitated through involvement by the glass and, thereby, abnormal appearance, e.g., a convex shape, tends to result. If the content of $B_2O_3$ in the second glass frit is less than 10 percent by mole, when used as the glass component of the external electrode, the adhesion force between the external electrode and the ceramic element is reduced. If the content exceeds 30 percent by mole, poor appearance exhibiting a convex appearance may result.

Preferably, the electroconductive paste of the present invention has a content of the above-described electroconductive powder of 60 to 80 percent by weight, a content of the glass powder composed of the first and the second glass frit of 4 to 10 percent by weight, and a content of the organic vehicle of 20 to 35 percent by weight. If the content of the electroconductive powder is less than 60 percent by weight, the electroconductivity is reduced. If the content exceeds 80 percent by weight, the viscosity as a paste is increased, and the printability may be deteriorated. If the content of the glass powder is less than 4 percent by weight, when used as, for example, the external electrode, the adhesion force to the ceramic element is reduced. If the content exceeds 10 percent by mole, the amount of flow of the glass is increased, and when used as, for example, the external electrode, the glass component seeps on the surface of the external electrode and, thereby, the conductivity of the external electrode may be deteriorated. If the content of the organic vehicle is less than 20 percent by weight, the viscosity as a paste is too increased, and if the content exceeds 35 percent by weight, the viscosity as a paste is too decreased. In each case, the printability may be deteriorated.

Advantages

According to the first to the forth aspects of the present invention, an electroconductive paste capable of realizing the mounting on a substrate by using the electroconductive adhesive without using Pb and forming an external electrode, which has improved moisture resistance and which is resistant to occurrence of external-electrode peeling, can be formed. Furthermore, by disposing the above-described external electrodes, an electroconductive paste with no external-electrode peeling nor deterioration in the electrical characteristics, as well as a ceramic electronic component including the electroconductive paste can be provided.

Figure 1:
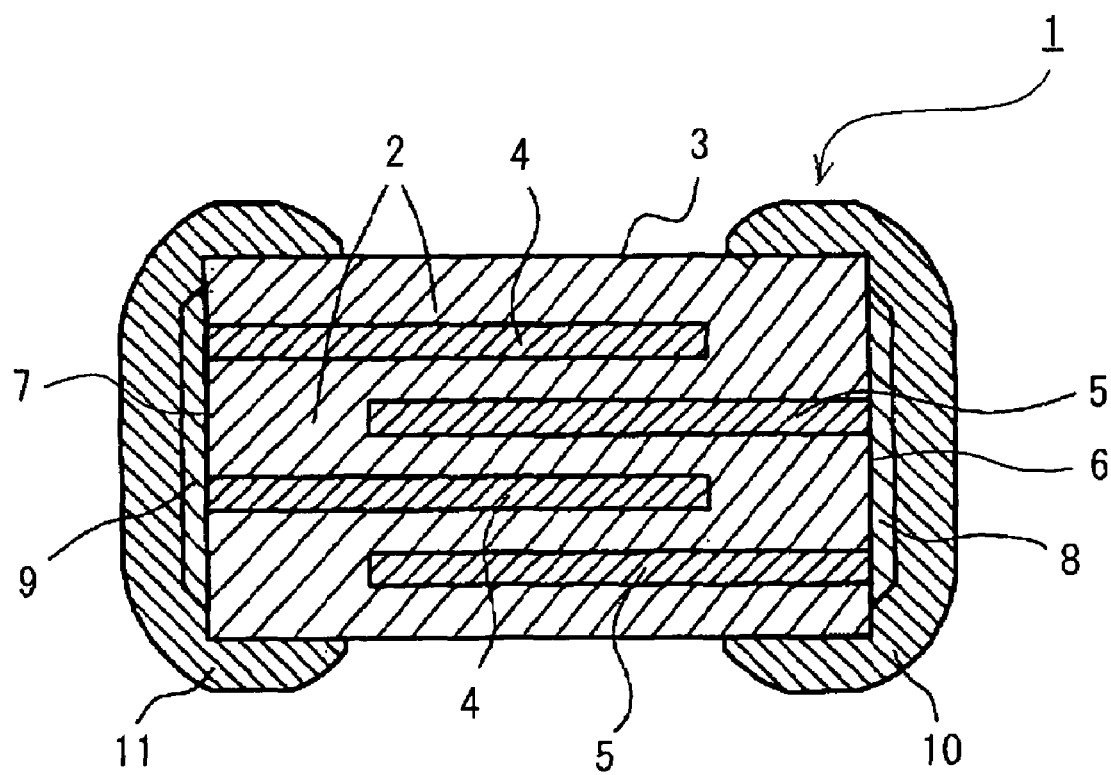
FIG. 1 is a sectional view showing an example of a ceramic electronic component including the electroconductive paste according to the present invention.

REFERENCE NUMERALS 1 ceramic electronic component
2 ceramic layer
3 laminate
4, 5 internal electrode layer
8, 9 first layer external electrode
10, 11 second layer external electrode

BEST MODE FOR CARRYING OUT THE INVENTION

A ceramic electronic component according to an embodiment of the present invention will be described below.

FIG. 1 is a sectional view showing a ceramic electronic component according to an embodiment of the present invention. The ceramic electronic component 1 of the present embodiment is provided with a laminate 3 composed of a plurality of ceramic layers 2, internal electrode layers 4 and 5, each interposed at the interface between upper and lower ceramic layers 2, 2 and disposed extending alternately from side surfaces of the laminate 3, first layer external electrodes 8 and 9 formed from Cu and connected to the internal electrodes 4 and 5, respectively, from the two side surfaces 6 and 7, respectively, of the laminate 3, and second layer external electrodes 10 and 11 disposed covering the external electrodes 8 and 9, respectively. An electroconductive paste of the present embodiment, as described below, is used for the second layer external electrodes 10 and 11. In the present embodiment, the external electrode is composed of two layers. However, the external electrode may have any layer structure as long as at least an exposed portion of the external electrode is formed by baking of the electroconductive paste according to the present invention. For example, the external electrode may be composed of three or more metal layers.

EXAMPLES

Example 1

In the present example, an electroconductive paste containing first glass frit was prepared and, thereafter, external electrodes of a ceramic electronic component were formed by using the resulting electroconductive paste. Subsequently, the external electrodes were evaluated.

(1) Preparation of Glass Frit for Electroconductive Paste

In the present example, individual powders of high purity boron oxide ($B_2O_3$), silicon dioxide ($SiO_2$), zinc oxide (ZnO), titanium oxide ($TiO_2$), zirconium oxide ($ZrO_2$), aluminum oxide ($Al_2O_3$), lithium oxide ($Li_2O$) sodium oxide ($Na_2O$), and strontium oxide (SrO) were prepared as starting materials for the first glass frit. Subsequently, these powders were formulated following the individual composition ratios shown in Table 1, so that a mixed powder was produced.

The above-described mixed powder was put into a crucible, and was placed in a furnace, so as to be kept at a maximum temperature within the range of 1,000° C. to 1,600° C. for 60 minutes. After it was ascertained that the above-described mixed powder was melted completely, the crucible was taken out of the furnace, and the molten mixed powder was put into pure water, so that bead-shaped glass was produced. The resulting bead-shaped glass was wet-milled for 16 hours by using a ball mill. Thereafter, a dehydration and drying treatment was performed, so that an intended first glass frit of each of Sample Nos. 1 to 21 was produced. It was ascertained by an X-ray diffraction method that the resulting first glass frit was amorphous. The softening point (the value calculated from a DTA curve based on DGT-50 produced by SHIMADZU CORPORATION) of the resulting first glass frit is shown in Table 1

TABLE 1

| Sample No. | Constituent component of glass frit (percent by mole) | | | | | | | | | Softening point ° C. |
|---|---|---|---|---|---|---|---|---|---|---|
| | $B_2O_3$ | $SiO_2$ | ZnO | $TiO_2$ | $ZrO_2$ | $Al_2O_3$ | $Li_2O$ | $Na_2O$ | SrO | |
| 1 | 20.0 | 51.0 | 4.0 | 2.0 | 3.0 | 2.0 | 18.0 | 0 | 0 | 587 |
| 2 | 10.0 | 61.0 | 3.0 | 4.0 | 4.0 | 2.0 | 10.0 | 6.0 | 0 | 634 |
| 3 | 12.0 | 65.0 | 2.0 | 2.0 | 2.0 | 2.0 | 5.0 | 10.0 | 0 | 641 |
| 4 | 19.0 | 50.0 | 3.0 | 2.0 | 4.0 | 2.0 | 10.0 | 10.0 | 0 | 582 |
| 5 | 18.0 | 58.0 | 5.0 | 1.0 | 4.0 | 3.0 | | 11.0 | 0 | 639 |
| 6 | 13.0 | 63.0 | 1.0 | 2.0 | 2.0 | 2.0 | 7.0 | 10.0 | 0 | 633 |
| 7 | 14.0 | 60.0 | 3.0 | 5.0 | 1.0 | 1.0 | 6.0 | 10.0 | 0 | 627 |

TABLE 1-continued

| Sample No. | Constituent component of glass frit (percent by mole) | | | | | | | | | Softening point °C. |
|---|---|---|---|---|---|---|---|---|---|---|
| | B$_2$O$_3$ | SiO$_2$ | ZnO | TiO$_2$ | ZrO$_2$ | Al$_2$O$_3$ | Li$_2$O | Na$_2$O | SrO | |
| 8 | 17.0 | 56.0 | 4.0 | 1.0 | 4.0 | 3.0 | 1.0 | 14.0 | 0 | 605 |
| 9 | 11.0 | 55.0 | 4.0 | 3.0 | 5.0 | 4.0 | 9.0 | 9.0 | 0 | 602 |
| 10 | 13.0 | 57.0 | 3.0 | 4.0 | 1.0 | 4.0 | 3.0 | 15.0 | 0 | 608 |
| 11 | 14.0 | 59.0 | 4.0 | 4.0 | 3.0 | 5.0 | 2.0 | 9.0 | 0 | 638 |
| 12 | 15.0 | 54.0 | 3.0 | 3.0 | 4.0 | 1.0 | 16.0 | 4.0 | 0 | 611 |
| 13 | 12.0 | 56.0 | 3.0 | 3.0 | 2.0 | 3.0 | 20.0 | 0 | 0 | 614 |
| 14 | 19.0 | 59.0 | 3.0 | 2.0 | 3.0 | 4.0 | 10.0 | 0 | 0 | 620 |
| 15 | 14.0 | 57.0 | 2.0 | 3.0 | 2.0 | 2.0 | 0 | 20.0 | 0 | 607 |
| 16 | 18.0 | 58.0 | 4.0 | 3.0 | 4.0 | 3.0 | 0 | 10.0 | 0 | 640 |
| *17 | 15.0 | 60.0 | 5.0 | 0 | 0 | 1.0 | 12.0 | 7.0 | 0 | 635 |
| *18 | 18.0 | 80.0 | 0 | 0 | 0 | 0 | 0 | 2.0 | 0 | 780 |
| *19 | 27.0 | 69.0 | 0 | 0 | 0 | 0 | 4.0 | 0 | 0 | 750 |
| *20 | 17.0 | 48.0 | 3.0 | 0 | 0 | 6.0 | 20.0 | 6.0 | 0 | 695 |
| *21 | 45.0 | 0 | 0 | 1.0 | 1.0 | 18.0 | 10.0 | 10.0 | 15 | 520 |

In the above-described Table 1, asterisked samples are out of the scope of the present invention, and the other samples are within the scope of the present invention.

(2) Preparation of Electroconductive Paste for Evaluation

An intended electroconductive paste of each of Sample Nos. 22 to 42 for evaluation was produced by mixing 5.0 percent by weight of the first glass frit of one of Sample Nos. 1 to 21 prepared in item (1), 30.0 percent by weight of spherical Ag powder having an average particle diameter of 0.7 µm, 30.0 percent by weight of flat Ag powder having an aspect ratio of 30 and an average particle diameter of 3.5 µm, 10.0 percent by weight of Pd powder having an average particle diameter of 0.6 µm, and 25.0 percent by weight of organic vehicle and kneading through the use of a triple roller mill. The sample number. of each first glass frit used for individual electroconductive pastes for evaluation is shown in Table 2.

In the above-described Table 2, asterisked samples are out of the scope of the present invention, and the other samples are within the scope of the present invention.

On the other hand, an intended electroconductive paste of each of Sample Nos. 43 to 61 for evaluation was produced by kneading 5.0 percent by weight of the first glass frit of Sample No. 4, 10.0 percent by weight of Pd powder having an average particle diameter of 0.6 µm, 24.0 percent by weight of the above-described organic vehicle, and 61.0 percent by weight of a mixed Ag powder in which a spherical Ag powder having an average particle diameter shown in Table 3 and a flat Ag powder having an aspect ratio and an average particle diameter shown in the same Table 3 are mixed at a mixing ratio shown in Table 3, through the use of a triple roller mill.

TABLE 2

| | Sample No. of electroconductive paste | Sample No. of glass frit used | External-electrode peeling (poor appearance) | Adhesion strength after temperature and humidity cycle test (N) | Moisture-resistance loading test (number) | Evaluation |
|---|---|---|---|---|---|---|
| | 22 | 1 | ○ | 9 | 0/18 | ○ |
| | 23 | 2 | ○ | 11 | 0/18 | ○ |
| | 24 | 3 | ○ | 11 | 0/18 | ○ |
| | 25 | 4 | ○ | 9 | 0/18 | ○ |
| | 26 | 5 | ○ | 10 | 0/18 | ○ |
| | 27 | 6 | ○ | 10 | 0/18 | ○ |
| | 28 | 7 | ○ | 10 | 0/18 | ○ |
| | 29 | 8 | ○ | 9 | 0/18 | ○ |
| | 30 | 9 | ○ | 10 | 0/18 | ○ |
| | 31 | 10 | ○ | 9 | 0/18 | ○ |
| | 32 | 11 | ○ | 9 | 0/18 | ○ |
| | 33 | 12 | ○ | 9 | 0/18 | ○ |
| | 34 | 13 | ○ | 9 | 0/18 | ○ |
| | 35 | 14 | ○ | 11 | 0/18 | ○ |
| | 36 | 15 | ○ | 8 | 0/18 | ○ |
| | 37 | 16 | ○ | 10 | 0/18 | ○ |
| * | 38 | 17 | X | 5 | 4/18 | X |
| * | 39 | 18 | X | 3 | 0/18 | X |
| * | 40 | 19 | X | 4 | 0/18 | X |
| * | 41 | 20 | ○ | 4 | 7/18 | X |
| * | 42 | 21 | ○ | 3 | 10/18 | X |

TABLE 3

| Sample No. | Spherical Ag powder average particle diameter [μm] | Flat Ag powder aspect ratio | Flat Ag powder average particle diameter [μm] | Mixing ratio of spherical Ag powder to flat Ag powder (spherical Ag powder:flat Ag powder) | Adhesion strength after temperature and humidity cycle test (N) | Moisture-resistance loading test (number) | Evaluation |
|---|---|---|---|---|---|---|---|
| 43 | 0.7 | 30 | 3.5 | 50:50 | 11 | 0/18 | ○ |
| 44 | 0.7 | 30 | 3.5 | 30:70 | 10 | 0/18 | ○ |
| 45 | 0.7 | 30 | 3.5 | 70:30 | 12 | 0/18 | ○ |
| 46 | 0.7 | 30 | 3.5 | 20:80 | 9 | 0/18 | ○ |
| 47 | 0.7 | 30 | 3.5 | 80:20 | 13 | 0/18 | ○ |
| 48 | 0.5 | 30 | 3.5 | 50:50 | 12 | 0/18 | ○ |
| 49 | 1.0 | 30 | 3.5 | 50:50 | 10 | 0/18 | ○ |
| 50 | 0.7 | 5 | 3.5 | 50:50 | 12 | 0/18 | ○ |
| 51 | 0.7 | 70 | 3.5 | 50:50 | 9 | 0/18 | ○ |
| 52 | 0.7 | 30 | 1.5 | 50:50 | 14 | 0/18 | ○ |
| 53 | 0.7 | 30 | 5.0 | 50:50 | 9 | 0/18 | ○ |
| 54 | 0.3 | 30 | 3.5 | 50:50 | 6 | 2/18 | X |
| 55 | 1.2 | 30 | 3.5 | 50:50 | 4 | 3/18 | X |
| 56 | 0.7 | 4 | 3.5 | 50:50 | 5 | 2/18 | X |
| 57 | 0.7 | 80 | 3.5 | 50:50 | 3 | 7/18 | X |
| 58 | 0.7 | 30 | 3.5 | 10:90 | 3 | 8/18 | X |
| 59 | 0.7 | 30 | 3.5 | 90:10 | 6 | 2/18 | X |
| 60 | 0.7 | 30 | 1.0 | 50:50 | 5 | 2/18 | X |
| 61 | 0.7 | 30 | 6.0 | 50:50 | 3 | 8/18 | X |

Here, the above-described organic vehicle was prepared by dissolving and mixing 20 percent by weight of an acrylic resin, e.g., ethyl methacrylate or butyl methacrylate, into 80 percent by weight of terpineol serving as a solvent.

In the present example, the electroconductive paste was produced through the use of the triple roller mill. However, a medialess dispersing apparatus, e.g., a grinder or a kneader, or a dispersing apparatus, e.g., a ball mill, including media may be used appropriately.

(3) Preparation of Ceramic Electronic Component for evaluation

Ceramic green sheets, which were for serving as the ceramic layers 2 and which contained, for example, a barium titanate based raw material powder for dielectric ceramic, were prepared. Electroconductive paste films for internal electrodes 4 and 5 having desired patterns were formed on the ceramic green sheets by printing or the like through the use of an electroconductive paste containing Cu, which is a base metal.

In the above-described printing, various printing methods, e.g., screen printing, gravure printing, offset printing, gravure-offset printing, and ink-jet printing, can be applied by adjusting the viscosity of the electroconductive paste.

A plurality of ceramic green sheets including ceramic green sheets provided with their respective electroconductive paste films were laminated and followed by thermal compression bonding, so that an integrated green laminate was produced.

The above-described green laminate was fired. In this firing, a reducing atmosphere was applied because the electroconductive paste film contained easy-to-oxidize Cu. The ceramic green sheets were sintered by the above-described firing so as to become the ceramic layers 2, and the electroconductive paste films were also sintered so that the internal electrode layers 4 and 5 were formed in the laminate 3.

Subsequently, first layer external electrodes 8 and 9 were formed on each of the end surfaces of the laminate 3 after the firing. The above-described external electrodes 8 and 9 were formed in such a way that 70.0 percent by weight of Cu powder having an average particle diameter of 1.0 μm, 5.0 percent by weight of glass frit of Sample No. 18 shown in Table 1, and 25.0 percent by weight of organic vehicle were kneaded with a triple roller mill, the resulting electroconductive paste was applied to end surfaces 6 and 7 of the laminate 3, followed by drying and, thereafter, baking was performed in a $N_2$ atmosphere at 850° C.

Furthermore, the second layer external electrodes 10 and 11 were formed by using the electroconductive pastes of Sample Nos. 22 to 61 so as to cover the above-described external electrodes 8 and 9. The above-described external electrodes 10 and 11 were formed by pastes being applied to cover the first layer external electrodes 8 and 9 serving as substrates, followed by drying, and being baked in a $N_2$ atmosphere at 700° C. in order that the first layer external electrodes 8 and 9 were not oxidized.

(4) Evaluation of External-Electrode Peeling

Whether external-electrode peeling occurred or not in the individual ceramic electronic components 1 including the electroconductive paste of Sample Nos. 22 to 61 prepared in the above-described item (2) was evaluated. For the above-described external-electrode peeling, 50 components of each ceramic electronic component 1 were taken, the appearance of each component was visually observed with a loupe at a magnification of 10 times from a side surface direction of the ceramic electronic component 1. In the case where even a small portion of the second layer external electrode 10 or 11 formed by using the electroconductive paste according to the present example or the first layer external electrode 8 or 9 serving as a substrate electrode was peeled, the ceramic electronic component 1 was evaluated as defective (indicated by x), and in the case where no portion was peeled, the ceramic electronic component 1 was evaluated as good (indicated by ○). The results thereof are shown in Tables 2 and 3.

(5) Evaluation of Environmental Resistance

A moisture-resistance loading test was performed as an environmental resistance test. For preparation of the moisture-resistance loading test, a predetermined electrode pattern was formed by screen printing or the like on a substrate composed of a glass-epoxy composite material, and the above-described ceramic electronic component 1 prepared in the above-described item (3) was mounted on the above-described electrode pattern by using an electroconductive adhesive.

The capacitance value and the insulation resistance value before the moisture-resistance loading test were measured in the state in which the ceramic electronic component 1 was mounted on the substrate. Subsequently, after standing for 500 hours in a moisture-resistance loading tester, bath kept at a temperature of 50° C. and a humidity of 95%, the capacitance value and the insulation resistance value after the moisture-resistance loading test were measured.

When the rate of change of the capacitance before and after the moisture-resistance loading test, as shown in the following Equation 1, was within ±2.5% and the insulation resistance value after the moisture-resistance loading test was $10^{11}$ Ω or more, the ceramic electronic component 1 was evaluated as good. When the above-described rate of change of the capacitance value was more than ±12.5% or the insulation resistance value after the above-described test was less than $10^{11}$ Ω, the ceramic electronic component 1 was evaluated as defective.

rate of change of capacitance value (%)={(capacitance value before test−capacitance value after test)/ capacitance value before test}×100   Equation 1:

The above-described moisture-resistance loading tests of 18 of each ceramic electronic component 1 including the electroconductive paste for evaluation were performed, and the number of components evaluated as defective are shown in Table 2 and Table 3.

(6) Evaluation of Adhesion Strength to Substrate

For a pretreatment of the adhesion strength measurement, 30 cycles of operation of a thermal shock tester were performed, where in one operation, the ceramic electronic component 1 prepared in the above-described item (3) was held for 30 minutes in a test bath kept at a temperature of 25° C. and a humidity of 85% and, thereafter, the above-described ceramic electronic component 1 was moved to another test bath kept at a temperature of 60° C. and a humidity of 85% so as to be held for 30 minutes.

The adhesion strength of the ceramic electronic component 1 subjected to the above-described pretreatment was measured. A predetermined electrode pattern was formed by screen printing or the like on a substrate composed of a glass-epoxy composite material, and the ceramic electronic component 1 subjected to the above-described pretreatment was mounted on the above-described electrode pattern by using an electroconductive adhesive. The substrate provided with the above-described ceramic electronic component 1 was held at a predetermined position in an adhesion strength measurement apparatus (Tension and Compression Tester produced by K. K. Imada Seisaku-sho), the center portion of the substrate was gradually bent with a pressure jig from the back surface side of the above-described substrate on which no ceramic electronic component 1 was mounted, and the value of pressure at the start point of peeling of the external electrode was detected as an adhesion strength. Measurements of 10 of each ceramic electronic component 1 were performed, and an average value thereof was taken as the adhesion strength. The results thereof are shown in Table 2 and Table 3.

As is clear from Table 2, in the case where the Ag powder added to the electroconductive paste was the same and the type of the first glass frit was changed as shown in Table 1, no external-electrode peeling occurred, adhesion strengths of 8 N or more were exhibited and, furthermore, no defective component resulted in the moisture-resistance loading test for the ceramic electronic components 1 of Sample Nos. 22 to 37 including the electroconductive pastes within the range of the present example. On the other hand, for the ceramic electronic components 1 of Sample Nos. 39 and 40 including electroconductive pastes out of the scope of the present invention, although no defective components resulted in the moisture-resistance loading test, external-electrode peeling occurred, and low adhesion strengths of 6 N or less were exhibited. For the ceramic electronic components 1 of Sample Nos. 38, 41, and 42, although no external-electrode peeling occurred, adhesion strengths were 6 N or less, and defective components resulted in the moisture-resistance loading test.

As is clear from Table 3, in the case where the first glass frit added to the electroconductive paste was the same and the shape and the mixing ratio of the Ag powder to be added were changed, no external-electrode peeling occurred, adhesion strengths of 9 N or more were exhibited and, furthermore, no defective component resulted in the moisture-resistance loading test for the ceramic electronic components 1 of Sample Nos. 43 to 53. On the other hand, for the ceramic electronic components 1 of Sample Nos. 54 and 61, external-electrode peeling occurred, low adhesion strengths of 6 N or less were exhibited, and defective components resulted in the moisture-resistance loading test.

Example 2

In the present example, an electroconductive paste containing both a Zn borosilicate based first glass frit and a Bi borosilicate based second glass frit was prepared and, thereafter, external electrodes of a ceramic electronic component 1 were formed by using the resulting electroconductive paste. Subsequently, the external electrodes were evaluated.

(1) Preparation of Glass Frit for Electroconductive Paste

As in Example 1, each of the Zn borosilicate based first glass frit and the Bi borosilicate based second glass frit shown in Table 4 was prepared. For the preparation, the starting materials shown in Table 4 were blended in such a way as to formulate individual compositions of the first and the second glass frit and mixed powders were prepared. Subsequently, in the same manner as that in Example 1, each of the above-described mixed powders was put into a crucible, and was placed in a furnace so as to be kept at a maximum temperature within the range of 800° C. to 1,300° C. for 60 minutes. After it was ascertained that the above-described mixed powder was melted completely, the crucible was taken out of the furnace, and the molten mixed powder was put into pure water so as to be vitrified. The resulting bead-shaped glass was wet-milled for 16 hours by using a ball mill, so that a fine glass powder was produced. A dehydration and drying treatment was performed so that each of the intended first glass frit and second glass frit of Sample Nos. 101 to 108 was produced. It was ascertained by an X-ray diffraction method that the resulting first glass frit and the second glass frit were amorphous. In the same manner as that in Example 1, the softening points (the value calculated from a DTA curve based on DGT-50 produced by SHIMADZU CORPORATION) of the first glass frit and the second glass frit are shown in Table 4. In Table 4, Sample No. 101 is the first glass frit, and the other Sample Nos. 102 to 108 are the second glass frit.

TABLE 4

| Sample No. | Constituent component of glass frit (percent by mole) | | | | | | | | | Softening point °C. |
|---|---|---|---|---|---|---|---|---|---|---|
| | $B_2O_3$ | $SiO_2$ | $Na_2O$ | $Al_2O_3$ | $TiO_2$ | $ZrO_2$ | $Li_2O$ | $ZnO$ | $Bi_2O_3$ | |
| 101 | 18.0 | 54.0 | 9.0 | 2.0 | 2.0 | 3.0 | 9.0 | 3.0 | | 592 |
| 102 | 17.0 | 53.0 | 4.0 | 1.5 | 4.0 | 3.5 | 7.0 | | 10.0 | 559 |
| 103 | 17.0 | 45.0 | 5.0 | 1.5 | 4.0 | 4.5 | 8.0 | | 15.0 | 541 |
| 104 | 8.0 | 51.0 | 4.0 | 1.0 | 4.0 | 5.0 | 7.0 | | 20.0 | 535 |
| 105 | 9.0 | 45.0 | 5.0 | 1.0 | 4.0 | 5.0 | 6.0 | | 25.0 | 513 |
| 106 | 10.0 | 40.0 | 4.0 | 1.0 | 4.0 | 4.0 | 7.0 | | 30.0 | 495 |
| 107 | 15.0 | 27.0 | 8.0 | | | | | | 50.0 | 440 |
| 108 | 17.0 | 55.0 | 9.0 | 2.0 | 2.0 | 2.0 | 4.0 | 6.0 | 3.0 | 600 |

(2) Preparation of Electroconductive Paste for Evaluation

Each of the glass frit of Sample Nos. 101 to 108 prepared in the item (1) was used, 18.0 percent by weight of spherical Ag powder having an average particle diameter of 0.7 µm, 42.0 percent by weight of flat Ag powder having an aspect ratio of 30 and an average particle diameter of 3.5 µm, 10.0 percent by weight of Pd powder having an average particle diameter of 0.6 µm, a total 5.0 percent by weight of the first and the second glass frit in a ratio shown in Table 5, and 25.0 percent by weight of organic vehicle were mixed and kneaded through the use of a triple roller mill, so that 500 g of electroconductive paste of Sample Nos. 109 to 123 for evaluation were produced. The organic vehicle was prepared by dissolving 20 percent by weight of an acrylic resin into terpineol.

TABLE 5

| Sample No. | Second Frit sample No. | Amount of frit sample No. 101 (percent by weight) | Amount of second frit sample ([percent by weight) | Poor appearance (convex defect) number | Tape peeling test (peeling defect) number |
|---|---|---|---|---|---|
| 109 | 104 | 99.0 | 1.0 | None | None |
| 110 | 104 | 99.4 | 0.6 | None | None |
| 111 | 104 | 99.6 | 0.4 | None | None |
| 112 | 104 | 99.7 | 0.3 | None | None |
| 113 | 103 | 99.4 | 0.6 | None | None |
| 114 | 105 | 99.4 | 0.6 | None | None |
| 115 | 106 | 99.4 | 0.6 | None | None |
| 116 | 106 | 99.0 | 1.0 | None | None |
| 117 | 102 | 99.4 | 0.6 | None | None |
| 118 | 107 | 99.0 | 1.0 | 11 | None |
| 119 | 107 | 99.4 | 0.6 | 5 | None |
| 120 | 107 | 99.7 | 0.3 | 3 | None |
| 121 | 104 | 98.0 | 2.0 | 7 | None |
| 122 | None | 100 | 0 | None | 3 |
| 123 | 108 | 99.4 | 0.6 | None | 2 |

(3) Preparation of Ceramic Electronic Component for Evaluation

Ceramic electronic components 1 were prepared by using the electroconductive pastes of Sample Nos. 109 to 123 in the same manner as that in Example 1.

(4) Evaluation of External-Electrode Peeling

In the present example, a tape peeling test was performed so as to evaluate the external-electrode peeling based on whether or not external-electrode peeling occurred. In the tape peeling test, a cellophane tape was pressed against a side surface of a ceramic electronic component 1 after baking of the external electrode, the cellophane tape was peeled, ceramic electronic components 1, in which external electrodes on the side surface had peeled, were checked visually, and the number of ceramic electronic components 1 in which external electrodes had peeled was counted and, thereby, the external-electrode peeling was evaluated. For the test, 20 of each Sample No. of ceramic electronic component 1 were taken, and each ceramic electronic component 1 was evaluated whether external-electrode peeling occurred or not. In this evaluation, when even a small portion of the AgPd electrode constituting the second layer external electrode 10 or 11 was peeled, the component was evaluated as defective. Furthermore, the appearance of end surfaces 6 and 7 of 50 of each ceramic electronic component 1 were visually observed with a loupe of a magnification of 10 times. In the case where poor appearance of even a small convex portion was observed with respect to the AgPd electrode (the second layer external electrode 10 or 11), the component was evaluated as defective. The results thereof are shown in Table 5.

As is clear from Table 5, the ceramic electronic component 1 including the electroconductive pastes of Sample Nos. 109 to 117 exhibited no poor appearance in the tape peeling test, nor abnormal appearance in the shape of a convex, which was an abnormal reaction product between AgPd constituting the second layer external electrodes 10 and 11 and Cu constituting the first layer external electrodes 8 and 9. Therefore, excellent external electrode were produced. That is, in the ceramic electronic components 1 including the electroconductive pastes of Sample Nos. 109 to 117 the external electrodes had high adhesion strength to the ceramic elements, and external-electrode peeling was suppressed even in the tape peeling test.

On the other hand, for the ceramic electronic components 1 including the electroconductive pastes of Sample Nos. 118 to 120 containing the second glass frit having a $Bi_2O_3$ content of 50 percent by mole that exceeds 30 percent by mole, no external-electrode peeling occurred, but an abnormal appearance in the shape of a convex was observed. Furthermore, for the ceramic electronic components 1 including the electroconductive pastes of Sample Nos. 122 and 123 containing the second glass frit having a $Bi_2O_3$ content less than 10 percent by mole, no abnormal appearance in the shape of a convex occurred, but external-electrode peeling was observed. Even when the second glass frit, had a $Bi_2O_3$ content of 10 to 30 percent by mole, for the ceramic electronic component 1 including the electroconductive paste in which the amount of mixing of the second glass frit was 2.0 percent by weight that exceeds 1.0 percent by weight, such as Sample No. 121, no peeling occurred, but an abnormal appearance in the shape of a convex occurred readily in the external electrode because the reaction between AgPd and the first layer Cu was facilitated through involvement by the glass.

The electroconductive paste of the present invention can appropriately include adhesives, e.g., a thixotropic agent, a viscosity stabilizer, an antioxidant, an antistatic agent, and a flame retardant, besides a dispersing agent, as long as the level of addition has no influence on the electrical characteristics.

Preferably, the mixing ratio of the Ag powder (C) to the Pd powder and/or Au powder (D), (C):(D), is 9:1 to 4:1. If the mixing ratio is out of the above-described range, undesirably, the electrical characteristics of the ceramic electronic component are deteriorated.

Furthermore, with respect to the method for forming the external electrode, for example, a method in which drying and baking are performed after screen printing or coating is performed can be appropriately used.

INDUSTRIAL APPLICABILITY

The present invention is suitable for use in, for example, electronic components, e.g., ceramic capacitors, to be used for electronic apparatuses.

The invention claimed is:

1. An electroconductive paste for an external electrode disposed on a surface of a ceramic electronic element characterized by comprising a base-metal electroconductive powder, glass frit, and an organic vehicle,
    wherein the glass frit comprises:
    a $B_2O_3$ content of 10 to 20 percent by mole;
    a $SiO_2$ content of 50 to 65 percent by mole;
    an alkali metal oxide content of 10 to 20 percent by mole;
    a ZnO content of 1 to 5 percent by mole;
    a $TiO_2$ content of 1 to 5 percent by mole;
    a $ZrO_2$ content of 1 to 5 percent by mole; and
    an $Al_2O_3$ content of 1 to 5 percent by mole;
    wherein the base-metal electroconductive powder comprises a primary component and a spherical secondary component comprising Pd or Au; and
    wherein the primary component is a 20:80 to 80:20 mixture of a spherical Ag powder having an average particle diameter of 0.5 to 1.0 μm and a flat Ag powder having an average particle diameter of 1.5 to 5.0 μm and an aspect ratio of 5 to 70.

2. The electroconductive paste according to claim 1, characterized by further comprising a second glass frit containing 10 to 30 percent by mole of $Bi_2O_3$, wherein the content of the second glass frit is 0.3 to 1.0 percent by weight based on the total weight of the first glass frit and the second glass frit.

3. The electroconductive paste according to claim 2, further characterized by the ratio of the primary component to the secondary component being 9:1 to 4:1.

4. The electroconductive paste according to claim 3, further characterized by the base-metal powder being 60 to 80 percent by weight, the glass frit being 4 to 10 percent by weight and the solvent being 20 to 35 percent by weight.

5. The electroconductive paste according to claim 2, further characterized by the base-metal powder being 60 to 80 percent by weight, the glass frit being 4 to 10 percent by weight and the solvent being 20 to 35 percent by weight.

6. The electroconductive paste according to claim 1, further characterized by the base-metal electroconductive powder being 60 to 80 percent by weight, the glass frit being 4 to 10 percent by weight and the solvent being 20 to 35 percent by weight.

7. A ceramic electronic component characterized by comprising:
    a ceramic element;
    at least one internal electrode disposed in the inside of the ceramic element; and
    at least one external electrode disposed on a surface of the ceramic element and electrically connected to an internal electrode,
    wherein a portion of a surface of the external electrode distant from the ceramic element is a baked electroconductive paste according to claim 6.

8. A ceramic electronic component characterized by comprising:
    a ceramic element;
    at least one internal electrode disposed in the inside of the ceramic element; and
    at least one external electrode disposed on a surface of the ceramic element and electrically connected to an internal electrode,
    wherein a portion of a surface of the external electrode distant from the ceramic element is a baked electroconductive paste according to claim 5.

9. A ceramic electronic component characterized by comprising:
    a ceramic element;
    at least one internal electrode disposed in the inside of the ceramic element; and
    at least one external electrode disposed on ae surface of the ceramic element and electrically connected to an internal electrode,
    wherein a portion of a surface of the external electrode distant from the ceramic element is a baked electroconductive paste according to claim 4.

10. A ceramic electronic component characterized by comprising:
    a ceramic element;
    at least one internal electrode disposed in the inside of the ceramic element; and
    at least one external electrode disposed on a surface of the ceramic element and electrically connected to an internal electrode,
    wherein a portion of a surface of the external electrode distant from the ceramic element is a baked electroconductive paste according to claim 3.

11. A ceramic electronic component characterized by comprising:
a ceramic element;
at least one internal electrode disposed in the inside of the ceramic element; and
at least one external electrode disposed on a surface of the ceramic element and electrically connected to an internal electrode,
wherein a portion of a surface of the external electrode distant from the ceramic element is a baked electroconductive paste according to claim 2.

12. A ceramic electronic component characterized by comprising:
a ceramic element;
at least one internal electrode disposed in the inside of the ceramic element; and
at least one external electrode disposed on a surface of the ceramic element and electrically connected to an internal electrode,
wherein a portion of a surface of the external electrode distant from the ceramic element is a baked electroconductive paste according to claim 1.

13. A ceramic electronic component characterized by comprising:
a ceramic element;
a pair of internal electrodes electrically isolated from each other and each of which is disposed in the inside of the ceramic element; and
a pair of external electrodes disposed on different portions of surfaces of the ceramic element, each of which external electrodes being electrically connected to a different internal electrode,
wherein a portion of each of said external electrodes disposed distant from the ceramic element is a baked electroconductive paste according to claim 1.

14. A ceramic electronic component characterized by comprising:
a ceramic element;
a pair of base metal internal electrodes electrically isolated from each other and each of which is disposed in the inside of the ceramic element; and
a pair of external electrodes disposed on different portions of surfaces of the ceramic element, each of which external electrodes is electrically connected to a different internal electrode,
wherein each external electrode comprise a first material electrically connected to an internal electrode and a second material electrically connected to said first material, said second material comprising a baked electroconductive paste according to claim 1.

15. A ceramic electronic component characterized by comprising:
a ceramic element;
a pair of base metal internal electrodes electrically isolated from each other and each of which is disposed in the inside of the ceramic element; and
a pair of external electrodes disposed on different portions of surfaces of the ceramic element, each of which external electrodes is electrically connected to a different internal electrode,
wherein each external electrode comprise a first material electrically connected to an internal electrode and a second material electrically connected to said first material, said second material comprising a baked electroconductive paste according to claim 4.

16. A ceramic electronic component characterized by comprising:
a ceramic element;
a pair of internal electrodes electrically isolated from each other and each of which is disposed in the inside of the ceramic element; and
a pair of external electrodes disposed on different portions of surfaces of the ceramic element, each of which external electrodes being electrically connected to a different internal electrode,
wherein a portion of each of said external electrodes disposed distant from the ceramic element is a baked electroconductive paste according to claim 4.

17. A ceramic electronic component characterized by comprising:
a ceramic element;
a pair of internal electrodes electrically isolated from each other and each of which is disposed in the inside of the ceramic element; and
a pair of external electrodes disposed on different portions of surfaces of the ceramic element, each of which external electrodes being electrically connected to a different internal electrode,
wherein a portion of each of said external electrodes disposed distant from the ceramic element is a baked electroconductive paste according to claim 3.

18. A ceramic electronic component characterized by comprising:
a ceramic element;
a pair of internal electrodes electrically isolated from each other and each of which is disposed in the inside of the ceramic element; and
a pair of external electrodes disposed on different portions of surfaces of the ceramic element, each of which external electrodes being electrically connected to a different internal electrode,
wherein a portion of each of said external electrodes disposed distant from the ceramic element is a baked electroconductive paste according to claim 2.

* * * * *